(12) United States Patent
Wu

(10) Patent No.: US 8,260,291 B2
(45) Date of Patent: Sep. 4, 2012

(54) METHOD FOR HANDLING PERIODIC PLMN SEARCH IN RRC CONNECTED MODE IN UMTS SYSTEM

(75) Inventor: Chih-Hsiang Wu, Taipei Hsien (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 765 days.

(21) Appl. No.: 11/306,364

(22) Filed: Dec. 26, 2005

(65) Prior Publication Data

US 2007/0149191 A1 Jun. 28, 2007

(51) Int. Cl.
*H04W 4/00* (2009.01)

(52) U.S. Cl. .................. 455/434; 455/432.1; 455/432.2; 455/432.3; 455/435.1; 455/435.2; 455/435.3

(58) Field of Classification Search ...... 455/432.1–435.3
See application file for complete search history.

(56) References Cited

U.S. PATENT DOCUMENTS

| 2002/0111180 | A1* | 8/2002 | Hogan et al. ................. | 455/518 |
| 2002/0123348 | A1* | 9/2002 | Willars et al. ................ | 455/436 |
| 2003/0021254 | A1 | 1/2003 | Fukuda | |
| 2004/0068571 | A1* | 4/2004 | Ahmavaara ................... | 709/228 |
| 2004/0109431 | A1* | 6/2004 | Abrahamson et al. ........ | 370/342 |
| 2004/0224689 | A1* | 11/2004 | Raghuram et al. ......... | 455/435.3 |
| 2005/0032542 | A1 | 2/2005 | Wilborn | |
| 2005/0213566 | A1* | 9/2005 | Jutila et al. ................... | 370/352 |
| 2005/0254469 | A1* | 11/2005 | Verma et al. .................. | 370/338 |
| 2006/0160537 | A1* | 7/2006 | Buckley et al. ............ | 455/435.2 |
| 2006/0183502 | A1* | 8/2006 | Jeong et al. ................... | 455/560 |
| 2006/0264215 | A1* | 11/2006 | Ekstedt et al. ............. | 455/435.2 |

FOREIGN PATENT DOCUMENTS

| WO | 01/63842 A1 | 8/2001 |
| WO | 2005/101886 A2 | 10/2005 |

OTHER PUBLICATIONS

3GPP TS 25.331, Mar. 2005. pp. 40-41, 256-257, vol. 6.5.0, Release 6.

"3rd Generation Partnership Project; Technical Specification Group Core Network; Non-Access-Stratum (NAS) functions related to Mobile Station (MS) in idle mode. (Release 6)". Technical Specification 3GPP TS 23.122, Mar. 2005, pp. 1-34, vol. 6.4.0.

"3rd Generation Partnership Project; Technical Specification Group Radio Access Network; User Equipment (UE) procedures in idle mode and procedures for cell reselection in connected mode. (Release 6)", Technical Specification 3GPP TS 25.304, Mar. 2005, pp. 1-38, vol. 6.5.0.

\* cited by examiner

*Primary Examiner* — Olumide T Ajibade Akonai
*Assistant Examiner* — Jaime Holliday
(74) *Attorney, Agent, or Firm* — Winston Hsu; Scott Margo

(57) ABSTRACT

A method of performing a periodic public land mobile network (PLMN) search for a mobile station in a CELL_PCH state of radio resource control (RRC) connected mode in a universal mobile telecommunications system (UMTS) is described. The method includes providing a mobile station operating in the CELL_PCH state camping on a serving cell of a PLMN utilizing a first PLMN identity; performing a periodic PLMN search with the mobile station and selecting a cell with a second PLMN identity, the second PLMN identity having a higher network priority than the first PLMN identity; and performing a CELL UPDATE procedure to register the mobile station with the selected cell utilizing the second PLMN identity if the serving cell and the selected cell are each associated with a common PLMN identity.

12 Claims, 4 Drawing Sheets

METHOD FOR HANDLING PERIODIC PLMN SEARCH IN RRC CONNECTED MODE IN UMTS SYSTEM

BACKGROUND OF THE INVENTION

1. Field of the Invention

The present invention relates to a wireless communications device, and more particularly, to an improved method of handling period PLMN searches in RRC connected mode for UMTS systems.

2. Description of the Prior Art

When a mobile station (MS) or user equipment (UE) is switched on, it attempts to make contact with a public land mobile network (PLMN). The particular PLMN to be contacted may be selected either automatically or manually.

The MS looks for a suitable cell of the chosen PLMN and chooses that cell to provide available services, and tunes to its control channel. This choosing is known as "camping on the cell". The MS will then register its presence in the registration area of the chosen cell if necessary, by means of a location registration (LR), GPRS attach procedure, or IMSI (International Mobile Subscriber Identity) attach procedure.

If the MS loses coverage of a cell, or finds a more suitable cell, it reselects onto the most suitable cell of the selected PLMN and camps on that cell. If the new cell is in a different registration area, an LR request is performed.

If the MS loses coverage of a PLMN, either a new PLMN is selected automatically, or an indication of which PLMNs are available is given to the user, so that a manual selection can be made. Registration is not performed by MSs only capable of services that need no registration.

Please refer to FIG. 1. FIG. 1 is a diagram illustrating cells contained in different UTRAN registration areas (URAs). As an example, two URAs are illustrated U1, U2. URA U1 contains two cells C1, C2, and URA U2 also contains two cells C3, C4.

In GSM as in many other 2G systems, the radio resource protocol states were generally divided into two groups: the idle and the connected states. In the idle state no dedicated radio resources existed between the UE and the base station. In the idle state, however, the mobile station is far from being "idle." There are several idle-mode tasks it must handle, tasks such as neighbor cell monitoring, cell reselection, paging channel reception, and broadcast data reception. In the connected state, however, a duplex radio connection is in place. The boundary between the idle and the connected mode is pretty clear; it is the existence of a dedicated radio resource. But in the new UTRAN system, this division is blurred. The idle state in UMTS is similar to GSM, as well as to those we find in other 2G systems: There is no uplink connection whatsoever. The UE has to monitor its radio environment regularly and, when necessary, perform a cell-reselection task. The reception of the broadcast system information and paging messages belong to the UE's idle-mode tasks. The connected state is different from the corresponding state in circuit switched 2G systems, but it has similarities with the packet-switched GPRS system. The connected mode is divided into four states: CELL_DCH, CELL_FACH, CELL_PCH, and URA_PCH. In the connected state there exists a logical RRC level connection between the UE and the UTRAN, but not necessarily a dedicated physical connection.

The CELL_PCH state is much like the idle mode because only the PICH is monitored regularly. The broadcast data (i.e., the system uplink activity is possible in the CELL_PCH state itself.

The URA_PCH state is quite similar to the CELL_PCH state, except that every cell change does not trigger a cell-update procedure. In this state an update procedure is only initiated if a UTRAN registration area changes, which is not done with every cell reselection. A state change to this state is requested by the UTRAN if it sees that the activity level of the UE is very low. The purpose of this state is to reduce the signaling activity because of cell updates. The drawback of this arrangement is that if the UTRAN wants to initiate data transmission while the RRC is in this state, it has to expand the paging area from one cell to several cells, possibly to the whole registration area because the location of the UE is not known with great accuracy.

The cell-reselection procedure, or as the 3GPP calls it, the cell reselection evaluation process, is performed in idle mode to keep the UE camped on a best cell. If the UE moves or the network conditions change, it may be necessary for the UE to change the cell it is camped on. This procedure checks that the UE is still camped on the best cell, or at least on a cell that is good enough for the UE's needs.

In normal idle mode, the UE has to monitor paging information and system information and perform cell measurements. The cell-reselection procedure will be triggered if the measurements indicate that a better cell has been found, or if the system information of the current cell indicates that new cell access restrictions are applied to the cell in question, such as cell barred. System information block 3 (SIB3) is an important message here because it tells the UE the quality parameter to measure, and also all the parameters for the cell-reselection evaluation algorithm. The neighbor cells to be measured are given in the neighbor cell list. In system information block 11 (SIB11), the results of these measurements are evaluated periodically. Based on these measurements the UE periodically evaluates the best cell status. If it seems that there is a better cell available, it will trigger a cell reselection procedure.

Please refer to FIG. 2. FIG. 2 is a diagram illustrating cells belonging to different PLMNs where no network sharing is used. As shown, cell C5 has a PLMN identity PLMN 1, and cell C6 has a different PLMN identity PLMN 2. Therefore, cells C5 and C6 belong to different telecommunications operators. Assuming a mobile station 10 is currently camped on cell C5, the mobile station 10 performs a periodic PLMN search for determining if there are nearby cells that belong to PLMNs with a higher priority. If the mobile station 10 determines that PLMN 2 has a higher priority than PLMN 1, the mobile station 10 will switch from cell C5 to cell C6 for utilizing PLMN 2 having a higher priority.

Suppose the mobile station 10 is in radio resource control (RRC) connected mode in the URA_PCH state and is camping on cell C5. When the mobile station 10 finds the cell C6 having a PLMN identity PLMN 2 that is higher than the PLMN identity PLMN 1 of the serving cell C5, the mobile station 10 will select cell C6 to camp on. When this happens, the mobile station 10 will enter idle mode from the URA_PCH state and then tries to establish a connection to register with PLMN 2 through cell C6.

If the mobile station 10 is in RRC connected mode in the CELL_PCH state, the same situation occurs if the mobile station 10 wishes to switch from cell C5 of PLMN 1 to cell C6 of PLMN 2 when PLMN 2 has a higher priority than PLMN 1. In this case, the mobile station 10 will enter idle mode from the CELL_PCH state and then tries to establish a connection to register with PLMN 2 through cell C6.

In the above examples illustrated in FIG. 2, the two cells C5 and C6 do not have a common PLMN identity. However, with network sharing becoming more popular since its introduction, new scenarios exist in which a cell can be shared among more than one operator, and therefore will have more than one PLMN identity. Please refer to FIG. 3. FIG. 3 is a diagram illustrating cells having common PLMN identities when network sharing is used. Due to network sharing, cell C7 has PLMN identities of PLMN 1 and PLMN 2 and cell C8 has PLMN identities of PLMN 2 and PLMN 3. Thus, both of the cells C7 and C8 have a common PLMN identity with PLMN 2.

According to the prior art, if the mobile station 10 is currently camped on cell C7 utilizing PLMN 1, the mobile station 10 performs a periodic PLMN search for determining if there are nearby cells that belong to PLMNs with a higher priority. If the mobile station 10 determines that PLMN 3 has a higher priority than PLMN 1, the mobile station 10 will switch from cell C7 to cell C8 for utilizing PLMN 3 having a higher priority.

Suppose the mobile station 10 is in RRC connected mode in the URA_PCH state and is camping on cell C7 utilizing PLMN 1. When the mobile station 10 finds the cell C8 having a PLMN identity PLMN 3 that is higher than the PLMN identity PLMN 1 of the serving cell C7, the mobile station 10 will select cell C8 to camp on. When this happens, the mobile station 10 will enter idle mode from the URA_PCH state and then tries to establish a connection to register with PLMN 3 through cell C8. Thus, even though the two cells C7 and C8 have a common PLMN identity PLMN 2, the mobile station 10 must still enter idle mode and establish a connection through the selected cell when switching from one cell to another since the mobile station 10 is switching from PLMN 1 to PLMN 3.

If the mobile station 10 is in RRC connected mode in the CELL_PCH state, the same situation occurs if the mobile station 10 wishes to switch from cell C7 of PLMN 1 to cell C8 of PLMN 3 when PLMN 3 has a higher priority than PLMN 1. In this case, the mobile station 10 will enter idle mode from the CELL_PCH state and then tries to establish a connection to register with PLMN 3 through cell C8.

Because the mobile station 10 moves to idle mode from either the CELL_PCH state or the URA_PCH state without signaling the UTRAN, the UTRAN has no idea that the mobile station 10 has entered idle mode. The UTRAN has to keep track of the radio resources for the mobile station 10 for a period of time, and if the UTRAN has no idea of the status of the mobile station 10, the radio resources are managed inefficiently if cells C7 and C8 have a common PLMN identity PLMN 2. In addition, the connection establishment time in idle mode is longer than the one in either the CELL_PCH state or the URA_PCH state.

SUMMARY OF THE INVENTION

It is therefore an objective of the claimed invention to provide a method for performing a periodic PLMN search while avoiding the problems described above.

According to the claimed invention, a method of performing a periodic public land mobile network (PLMN) search for a mobile station in a CELL_PCH state of radio resource control (RRC) connected mode in a universal mobile telecommunications system (UMTS) is described. The method includes providing a mobile station operating in the CELL_PCH state camping on a serving cell of a PLMN utilizing a first PLMN identity; performing a periodic PLMN search with the mobile station and selecting a cell with a second PLMN identity, the second PLMN identity having a higher network priority than the first PLMN identity; and performing a CELL UPDATE procedure to register the mobile station with the selected cell utilizing the second PLMN identity if the serving cell and the selected cell are each associated with a common PLMN identity.

According to another exemplary embodiment of the claimed invention, a method of performing a periodic PLMN search for a mobile station in a URA_PCH state of RRC connected mode in a UMTS is described. The method includes providing a mobile station operating in the URA_PCH state camping on a serving cell of a PLMN utilizing a first PLMN identity; performing a periodic PLMN search with the mobile station and selecting a cell with a second PLMN identity, the second PLMN identity having a higher network priority than the first PLMN identity; and performing a CELL UPDATE procedure to register the mobile station with the selected cell utilizing the second PLMN identity if the serving cell and the selected cell are each associated with a common PLMN identity.

According to yet another exemplary embodiment of the claimed invention, a method of performing a periodic PLMN search for a mobile station in a CELL_PCH state or a URA_PCH state of RRC connected mode in a UMTS is described. The method includes providing a mobile station operating in the CELL_PCH state or the URA_PCH state camping on a serving cell of a PLMN utilizing a first PLMN identity; and setting priorities of PLMN identities for cells neighboring the serving cell to be equal to the priority of the first PLMN identity while the mobile station is in the CELL_PCH state or the URA_PCH state.

According to an exemplary embodiment of the present invention, a method of performing a periodic public land mobile network (PLMN) search for a mobile station in a CELL_PCH state of radio resource control (RRC) connected mode in a universal mobile telecommunications system (UMTS) is described. The method includes providing a mobile station operating in the CELL_PCH state camping on a serving cell of a PLMN utilizing a first PLMN identity; performing a periodic PLMN search with the mobile station and finding a cell with a second PLMN identity, the second PLMN identity having a higher network priority than the first PLMN identity; and keeping the mobile station in the serving cell of the PLMN utilizing the first PLMN identity if the serving cell and the selected cell are each associated with a common PLMN identity.

According to an exemplary embodiment of the present invention, a method of performing a periodic public land mobile network (PLMN) search for a mobile station in a URA_PCH state of radio resource control (RRC) connected mode in a universal mobile telecommunications system (UMTS) is described. The method includes providing a mobile station operating in the URA_PCH state camping on a serving cell of a PLMN utilizing a first PLMN identity; performing a periodic PLMN search with the mobile station and finding a cell with a second PLMN identity, the second PLMN identity having a higher network priority than the first PLMN identity; and keeping the mobile station in the serving cell of the PLMN utilizing the first PLMN identity if the serving cell and the selected cell are each associated with a common PLMN identity.

It is an advantage of the present invention that when the mobile station is in the CELL_PCH state or the URA_PCH state of RRC connected mode and attempts to change to a selected cell having a higher priority PLMN identity when the serving cell and the selected cell are each associated with a common PLMN identity, the mobile station does not have to first enter idle mode before establishing a new connection through the selected cell. Thus, significant time and UTRAN resources are saved using the present invention methods.

These and other objectives of the present invention will no doubt become obvious to those of ordinary skill in the art after reading the following detailed description of the preferred embodiment that is illustrated in the various figures and drawings.

DETAILED DESCRIPTION

The present invention provides methods for overcoming the prior art problems of having to enter idle mode when changing from a serving cell to a selected cell having a common PLMN identity as the serving cell while in the CELL_PCH state or the URA_PCH state of RRC connected mode. The invention relates to matter disclosed in the following technical documents, each of which are herein incorporated by reference:

1. 3GPP TS 25.331 V6.5.0 (2005-03) Technical Specification 3rd Generation Partnership Project; Technical Specification Group Radio Access Network; Radio Resource Control (RRC); Protocol Specification (Release 6)

2. 3GPP TR 23.851 V6.1.0 (2004-06) Technical Report 3rd Generation Partnership Project; Technical Specification Group Services and System Aspects; Network sharing; Architecture and Functional Description (Release 6)

3. 3GPP TS 25.304 V6.5.0 (2005-03) Technical Specification 3rd Generation Partnership Project; Technical Specification Group Radio Access Network; User Equipment (UE) procedures in idle mode and procedures for cell reselection in connected mode (Release 6)

4. 3GPP TS 23.122 V6.4.0 (2005-03) Technical Specification 3rd Generation Partnership Project; Technical Specification Group Core Network; Non-Access-Stratum (NAS) functions related to Mobile Station (MS) in idle mode (Release 6)

Figure 1:
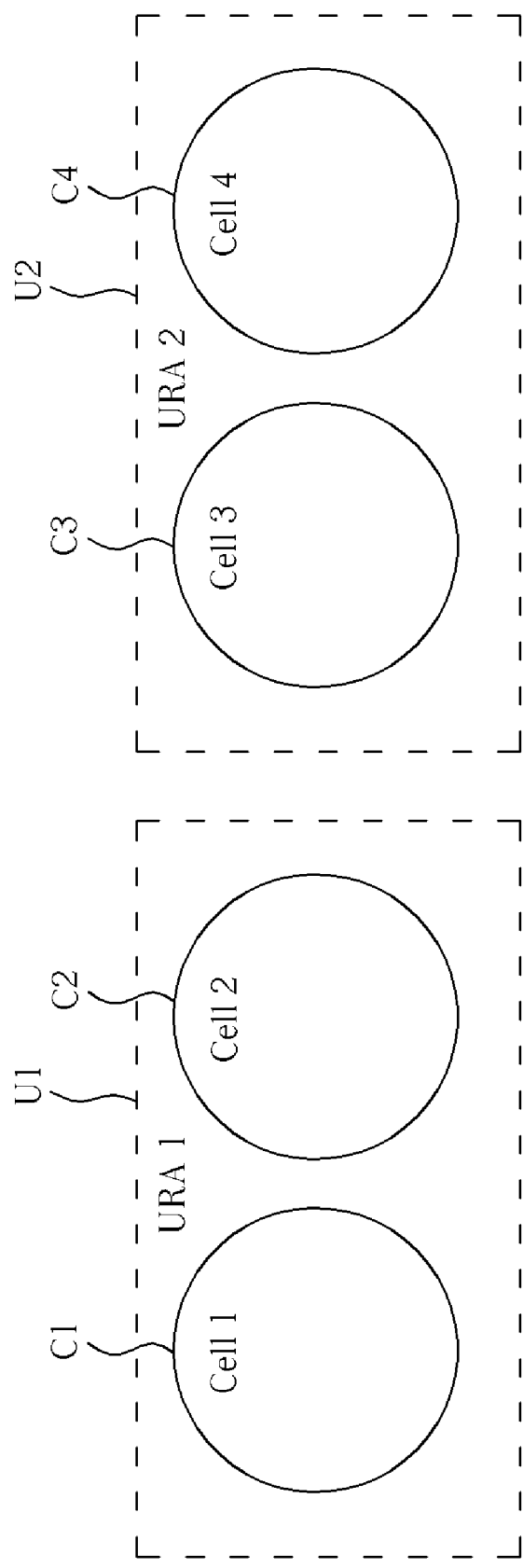
FIG. 1 is a diagram illustrating cells contained in different URAs.
Figure 2:
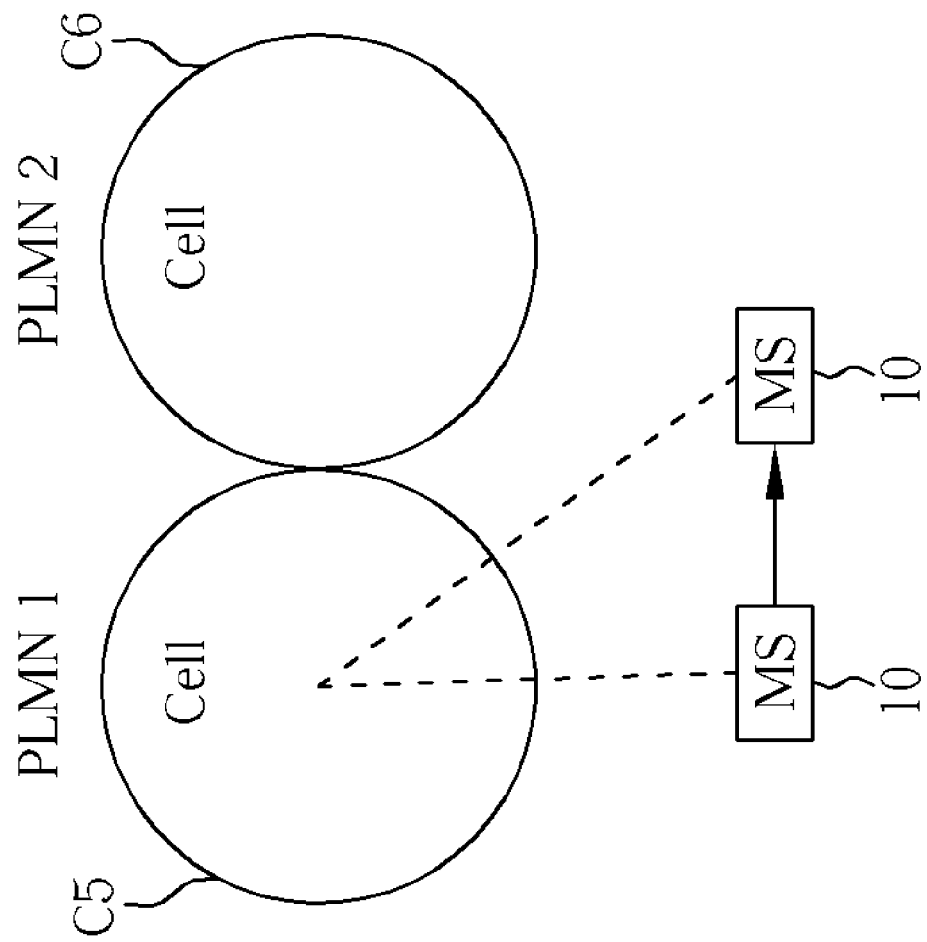
FIG. 2 is a diagram illustrating cells belonging to different PLMNs where no network sharing is used.
Figure 3:
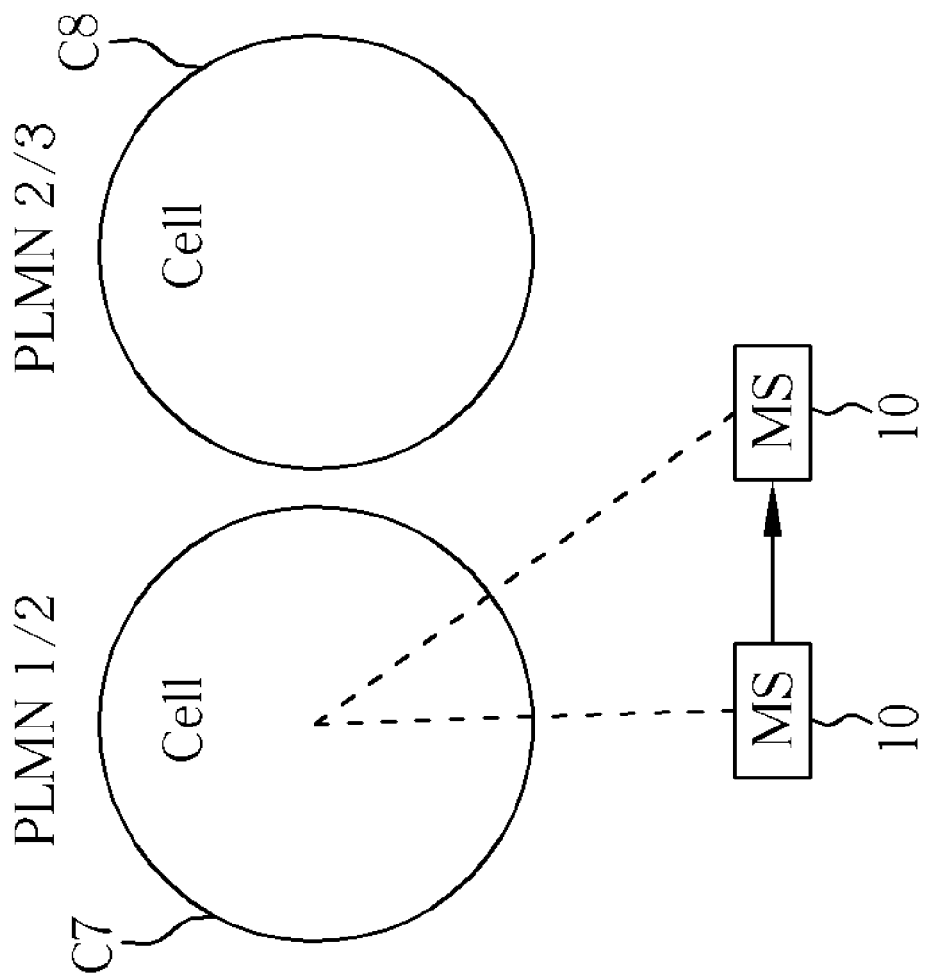
FIG. 3 is a diagram illustrating cells having common PLMN identities when network sharing is used.

Please refer back to FIG. 3. If the mobile station 10 is camping on a serving cell in the CELL_PCH state and a cell with higher PLMN priority is found during a periodic PLMN search, the mobile station 10 does not have to enter idle mode in order to establish a connection through the selected cell if the selected cell and the serving cell are each associated with a common PLMN identity. Using the example illustrated in FIG. 3, suppose that the mobile station 10 is camped on cell C7 utilizing the PLMN identity PLMN 1. Cell C7 is associated with PLMN identities PLMN 1 and PLMN 2 through a network sharing agreement. If the mobile station 10 performs a periodic PLMN search and discovers that cell C8 is associated with a higher priority PLMN identity, namely PLMN 3, then the mobile station 10 will select cell C8 to register through. In this case, cell C8 is associated with PLMN identities PLMN 2 and PLMN 3 through a network sharing agreement. Since both cell C7 and cell C8 are associated with the common PLMN identity PLMN 2, it is not necessary for the mobile station 10 to enter idle mode and then try to establish an RRC connection to register with PLMN 3 through cell C8. Instead, the mobile station 10 can simply perform a CELL UPDATE procedure to register the mobile station 10 with cell C8. If, however, there is no common PLMN identity that both the serving cell C7 and the selected cell C8 share, then the mobile station 10 will have to enter idle mode and then try to establish an RRC connection to register with PLMN 3 through cell C8 according to the prior art method. Additionally, if the selected cell C8 is not in the neighboring cell list of the serving cell C7, the mobile station 10 will also enter idle mode from the CELL_PCH state and try to establish an RRC connection through the selected cell.

Instead of automatically performing the CELL UPDATE procedure if cell C8 has a higher priority PLMN identity than cell C7 when cell C7 and cell C8 have a common PLMN identity, the mobile station 10 can instead keep camping on the serving cell in the CELL_PCH state. However, if a cell reselection evaluation is performed and cell C8 is deemed to be better than cell C7, then the CELL UPDATE procedure can be performed to register the mobile station 10 with cell C8.

The above method also works when the mobile station 10 is in the URA_PCH state while performing the periodic PLMN search. In this case, since both cell C7 and cell C8 are associated with the common PLMN identity PLMN 2, it is not necessary for the mobile station 10 to enter idle mode and then try to establish an RRC connection to register with PLMN 3 through cell C8. Instead, the mobile station 10 can simply perform a CELL UPDATE procedure to register the mobile station 10 with cell C8. If, however, there is no common PLMN identity that both the serving cell C7 and the selected cell C8 share, then the mobile station 10 will have to enter idle mode and then try to establish an RRC connection to register with PLMN 3 through cell C8 according to the prior art method. Additionally, if the selected cell C8 is not in the neighboring cell list of the serving cell C7, the mobile station 10 will also enter idle mode from the URA_PCH state and try to establish an RRC connection through the selected cell.

Instead of automatically performing the CELL UPDATE procedure if cell C8 has a higher priority PLMN identity than cell C7 when cell C7 and cell C8 have a common PLMN identity, the mobile station 10 can instead keep camping on the serving cell in the URA_PCH state. However, if a cell reselection evaluation is performed and cell C8 is deemed to be better than cell C7, then the CELL UPDATE procedure can be performed to register the mobile station 10 with cell C8.

Figure 4:
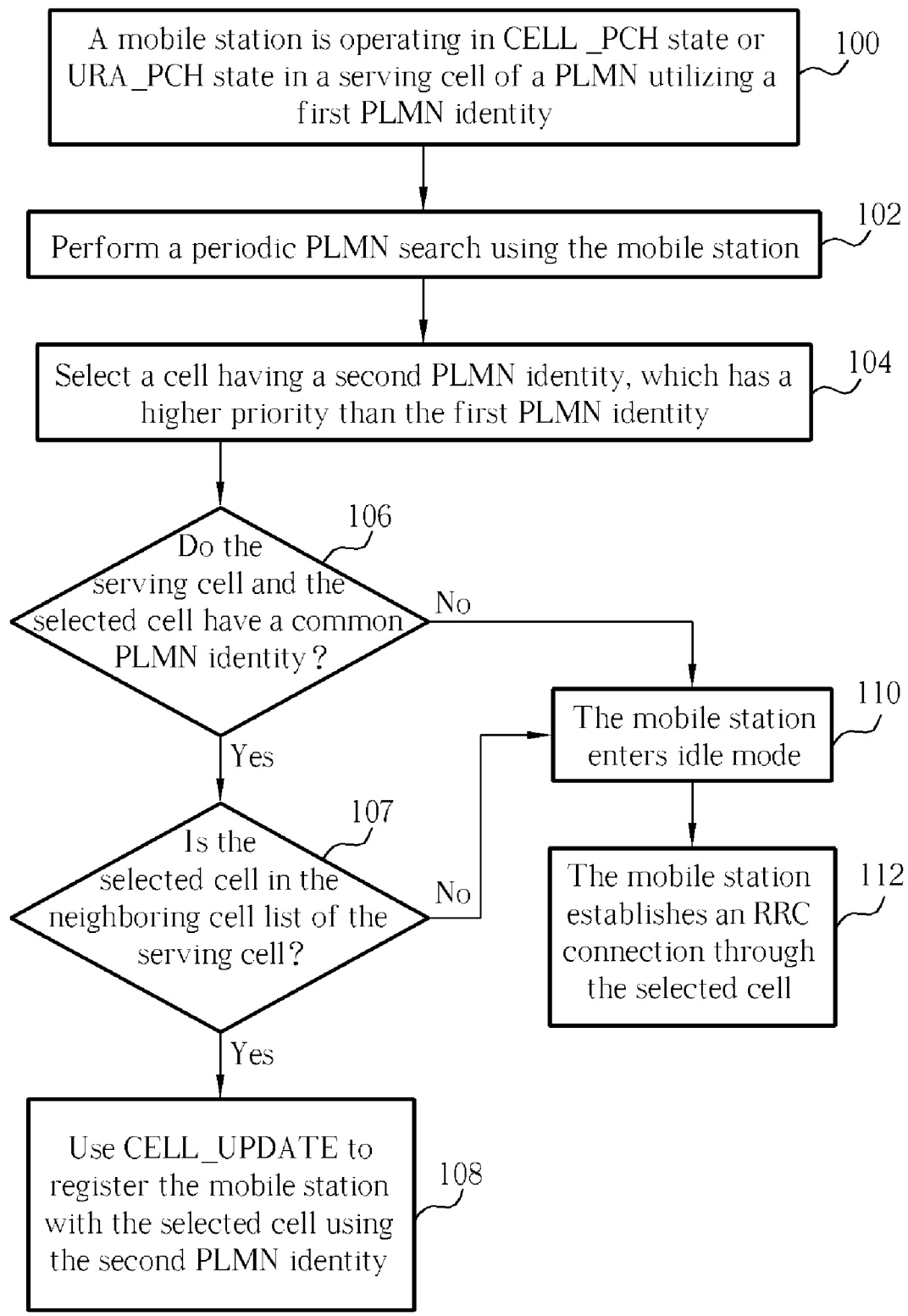
FIG. 4 is a flowchart illustrating the mobile station changing from a serving cell to a selected cell having a common PLMN identity as the serving cell while in the CELL_PCH state or the URA_PCH state of RRC connected mode.

The above two methods are summarized in FIG. 4. FIG. 4 is a flowchart illustrating the mobile station 10 changing from a serving cell to a selected cell having a common PLMN identity as the serving cell while in the CELL_PCH state or the URA_PCH state of RRC connected mode. Steps contained in the flowchart will be explained below.

Step 100: The mobile station 10 is operating in CELL_PCH state or URA_PCH state in a serving cell of a PLMN utilizing a first PLMN identity;

Step 102: Perform a periodic PLMN search using the mobile station 10;

Step 104: Select a cell having a second PLMN identity, which has a higher priority than the first PLMN identity;

Step 106: Determine if the serving cell and the selected cell have a common PLMN identity. If so, go to step 107. Otherwise, go to step 110;

Step 107: Determine if the selected cell is in the neighboring cell list of the serving cell. If so, go to step 108. Otherwise, go to step 110;

Step 108: Use CELL_UPDATE to register the mobile station 10 with the selected cell using the second PLMN identity;

Step 110: The mobile station 10 enters idle mode; and

Step 112: The mobile station 10 establishes an RRC connection through the selected cell.

Another method can also be used to ensure that the mobile station 10 does not have to enter idle mode from either the CELL_PCH state or the URA_PCH state when performing a periodic PLMN search. Since the problem arises when the mobile station 10 finds another cell having a PLMN identity with a higher priority than the PLMN identity utilized by the mobile station 10 in the serving cell, the present invention provides a solution by setting the priorities of PLMN identities of all cells neighboring the serving cell to be equal to the priority of the PLMN identity of the serving cell while the mobile station 10 is in the CELL_PCH state or the URA_PCH state. Therefore, there will be less cell changes required since all neighboring cells will have the same PLMN priority values as the serving cell.

In summary, by preventing the mobile station 10 from having to enter idle mode in some instances when changing from one cell to another when the mobile station 10 is in the CELL_PCH state or the URA_PCH state of RRC connected mode, the present invention saves time when changing cells, and frees up UTRAN resources that are needed when the cell change occurs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing a periodic public land mobile network (PLMN) search for a mobile station in a CELL_PCH state of radio resource control (RRC) connected mode in a universal mobile telecommunications system (UMTS), the method comprising:
   providing a mobile station operating in the CELL_PCH state camping on a serving cell of a PLMN utilizing a first PLMN identity;
   performing a periodic PLMN search with the mobile station and selecting a cell with a second PLMN identity, the second PLMN identity having a higher network priority than the first PLMN identity;
   performing a CELL UPDATE procedure to register the mobile station with the selected cell utilizing the second PLMN identity only if the serving cell has at least one PLMN identity that is equal common to a PLMN identity of the selected cell, and if the selected cell is in a neighboring cell list of the serving cell, wherein at least one of the serving cell and the selected cell has multiple PLMN identities;
   the mobile station entering idle mode from the CELL PCH state if the serving cell and the selected cell are not associated with the common PLMN identity; and
   establishing an RRC connection through the selected cell.

2. The method of claim 1, further comprising:
   the mobile station entering idle mode from the CELL_PCH state if the selected cell is not in the neighboring cell list of the serving cell; and
   establishing an RRC connection through the selected cell.

3. A method of performing a periodic public land mobile network (PLMN) search for a mobile station in a URA_PCH state of radio resource control (RRC) connected mode in a universal mobile telecommunications system (UMTS), the method comprising:
   providing a mobile station operating in the URA_PCH state camping on a serving cell of a PLMN utilizing a first PLMN identity;
   performing a periodic PLMN search with the mobile station and selecting a cell with a second PLMN identity, the second PLMN identity having a higher network priority than the first PLMN identity;
   performing a CELL UPDATE procedure to register the mobile station with the selected cell utilizing the second PLMN identity only if the serving cell has at least one PLMN identity that is equal common to a PLMN identity of the selected cell, and if the selected cell is in a neighboring cell list of the serving cell, wherein at least one of the serving cell and the selected cell has multiple PLMN identities;
   the mobile station entering idle mode from the URA PCH state if the serving cell and the selected cell are not associated with the common PLMN identity; and
   establishing an RRC connection through the selected cell.

4. The method of claim 3, further comprising:
   the mobile station entering idle mode from the URA_PCH state if the selected cell is not in the neighboring cell list of the serving cell; and
   establishing an RRC connection through the selected cell.

5. A method of performing a periodic public land mobile network (PLMN) search for a mobile station in a CELL_PCH state of radio resource control (RRC) connected mode in a universal mobile telecommunications system (UMTS), the method comprising:
   providing a mobile station operating in the CELL_PCH state camping on a serving cell of a PLMN utilizing a first PLMN identity;
   performing a periodic PLMN search with the mobile station and finding a cell with a second PLMN identity, the second PLMN identity having a higher network priority than the first PLMN identity;
   keeping the mobile station in the serving cell of the PLMN utilizing the first PLMN identity only if the serving cell has at least one PLMN identity that is equal common to a PLMN identity of the selected cell, wherein at least one of the serving cell and the selected cell has multiple PLMN identities;
   selecting the cell with the second PLMN identity if the selected cell is deemed to be better than the serving cell as a result of a cell reselection evaluation; and
   performing a CELL UPDATE procedure to register the mobile station with the selected cell utilizing the second PLMN identity.

6. A method of performing a periodic public land mobile network (PLMN) search for a mobile station in a URA_PCH state of radio resource control (RRC) connected mode in a universal mobile telecommunications system (UMTS), the method comprising:
   providing a mobile station operating in the URA_PCH state camping on a serving cell of a PLMN utilizing a first PLMN identity;
   performing a periodic PLMN search with the mobile station and finding a cell with a second PLMN identity, the second PLMN identity having a higher network priority than the first PLMN identity;
   keeping the mobile station in the serving cell of the PLMN utilizing the first PLMN identity only if the serving cell has at least one PLMN identity that is equal common to a PLMN identity of the selected cell, wherein at least one of the serving cell and the selected cell has multiple PLMN identities;
   selecting the cell with the second PLMN identity if the selected cell is deemed to be better than the serving cell as a result of a cell reselection evaluation; and performing a CELL UPDATE procedure to register the mobile station with the selected cell utilizing the second PLMN identity.

7. A system for performing a periodic public land mobile network (PLMN) search for a mobile station in a CELL_PCH state of radio resource control (RRC) connected mode in a universal mobile telecommunications system (UMTS), the system comprising:
- a means for providing a mobile station operating in the CELL_PCH state camping on a serving cell of a PLMN utilizing a first PLMN identity;
- a means for performing a periodic PLMN search with the mobile station and selecting a cell with a second PLMN identity, the second PLMN identity having a higher network priority than the first PLMN identity;
- a means for performing a CELL UPDATE procedure to register the mobile station with the selected cell utilizing the second PLMN identity only if the serving cell has at least one PLMN identity that is equal common to a PLMN identity of the selected cell, and if the selected cell is in a neighboring cell list of the serving cell, wherein at least one of the serving cell and the selected cell has multiple PLMN identities;
- a means for facilitating the mobile station entering idle mode from the CELL PCH state if the serving cell and the selected cell are not associated with the common PLMN identity; and
- a means for establishing an RRC connection through the selected cell.

8. The system of claim 7, further comprising:
- a means for facilitating the mobile station entering idle mode from the CELL_PCH state if the selected cell is not in the neighboring cell list of the serving cell; and
- a means for establishing an RRC connection through the selected cell.

9. A system for performing a periodic public land mobile network (PLMN) search for a mobile station in a URA_PCH state of radio resource control (RRC) connected mode in a universal mobile telecommunications system (UMTS), the system comprising:
- a means for providing a mobile station operating in the URA_PCH state camping on a serving cell of a PLMN utilizing a first PLMN identity;
- a means for performing a periodic PLMN search with the mobile station and selecting a cell with a second PLMN identity, the second PLMN identity having a higher network priority than the first PLMN identity;
- a means for performing a CELL UPDATE procedure to register the mobile station with the selected cell utilizing the second PLMN identity only if the serving cell has at least one PLMN identity that is equal common to a PLMN identity of the selected cell, and if the selected cell is in a neighboring cell list of the serving cell, wherein at least one of the serving cell and the selected cell has multiple PLMN identities;
- a means for facilitating the mobile station entering idle mode from the URA PCH state if the serving cell and the selected cell are not associated with the common PLMN identity; and
- a means for establishing an RRC connection through the selected cell.

10. The system of claim 9, further comprising:
- a means for facilitating the mobile station entering idle mode from the URA_PCH state if the selected cell is not in the neighboring cell list of the serving cell; and
- a means for establishing an RRC connection through the selected cell.

11. A system for performing a periodic public land mobile network (PLMN) search for a mobile station in a CELL_PCH state of radio resource control (RRC) connected mode in a universal mobile telecommunications system (UMTS), the system comprising:
- a means for providing a mobile station operating in the CELL_PCH state camping on a serving cell of a PLMN utilizing a first PLMN identity;
- a means for performing a periodic PLMN search with the mobile station and finding a cell with a second PLMN identity, the second PLMN identity having a higher network priority than the first PLMN identity;
- a means for keeping the mobile station in the serving cell of the PLMN utilizing the first PLMN identity only if the serving cell has at least one PLMN identity that is equal common to a PLMN identity of the selected cell, wherein at least one of the serving cell and the selected cell has multiple PLMN identities;
- a means for selecting the cell with the second PLMN identity if the selected cell is deemed to be better than the serving cell as a result of a cell reselection evaluation; and
- a means for performing a CELL UPDATE procedure to register the mobile station with the selected cell utilizing the second PLMN identity.

12. A system for performing a periodic public land mobile network (PLMN) search for a mobile station in a URA_PCH state of radio resource control (RRC) connected mode in a universal mobile telecommunications system (UMTS), the system comprising:
- a means for providing a mobile station operating in the URA_PCH state camping on a serving cell of a PLMN utilizing a first PLMN identity;
- a means for performing a periodic PLMN search with the mobile station and finding a cell with a second PLMN identity, the second PLMN identity having a higher network priority than the first PLMN identity;
- a means for keeping the mobile station in the serving cell of the PLMN utilizing the first PLMN identity only if the serving cell has at least one PLMN identity that is equal common to a PLMN identity of the selected cell, wherein at least one of the serving cell and the selected cell has multiple PLMN identities;
- a means for selecting the cell with the second PLMN identity if the selected cell is deemed to be better than the serving cell as a result of a cell reselection evaluation; and
- a means for performing a CELL UPDATE procedure to register the mobile station with the selected cell utilizing the second PLMN identity.

* * * * *